Nov. 14, 1944.　　　　T. O. MEHAN　　　　2,362,709
CALCULATING MACHINE
Filed Nov. 21, 1941　　　　5 Sheets-Sheet 4

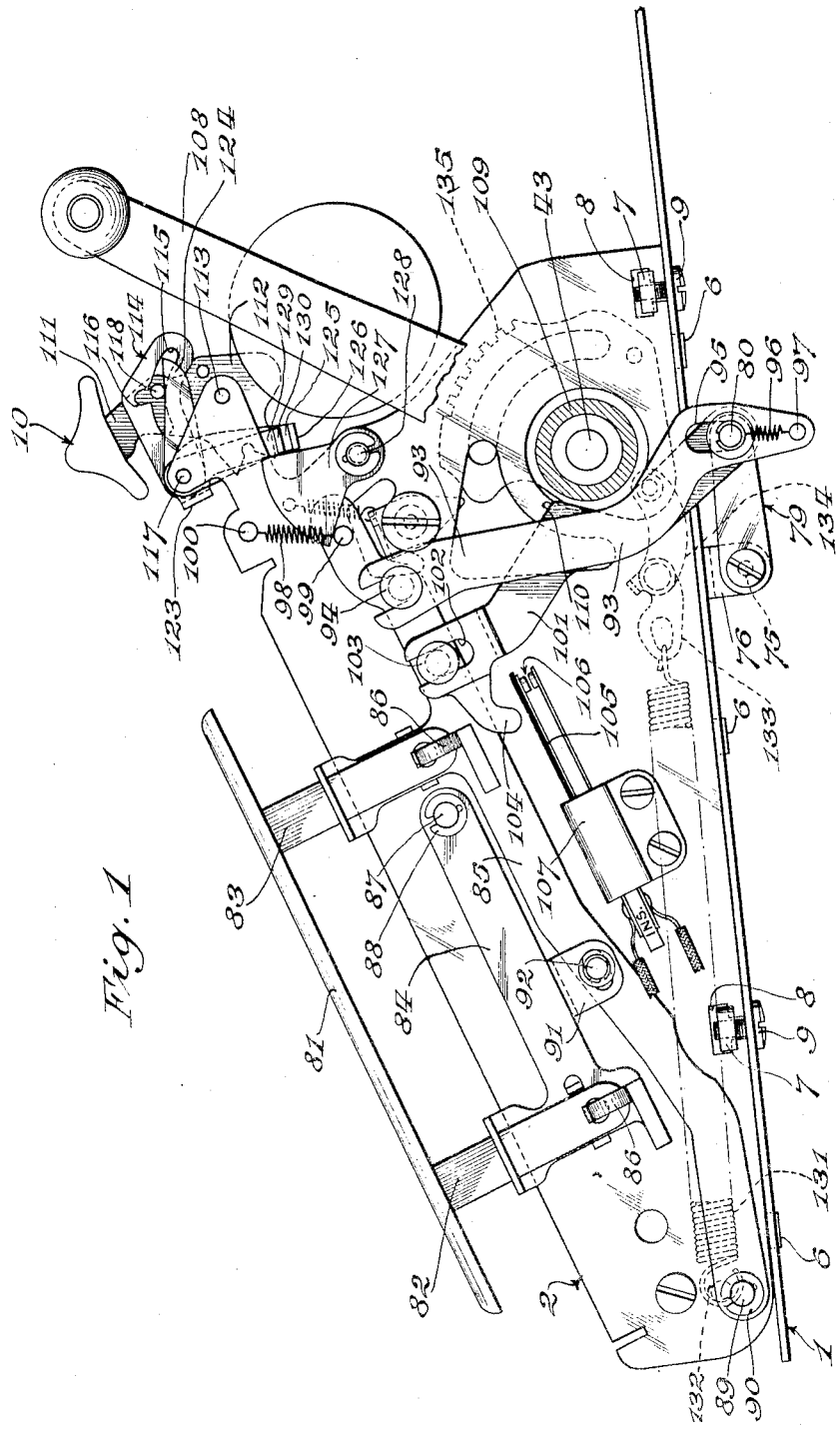

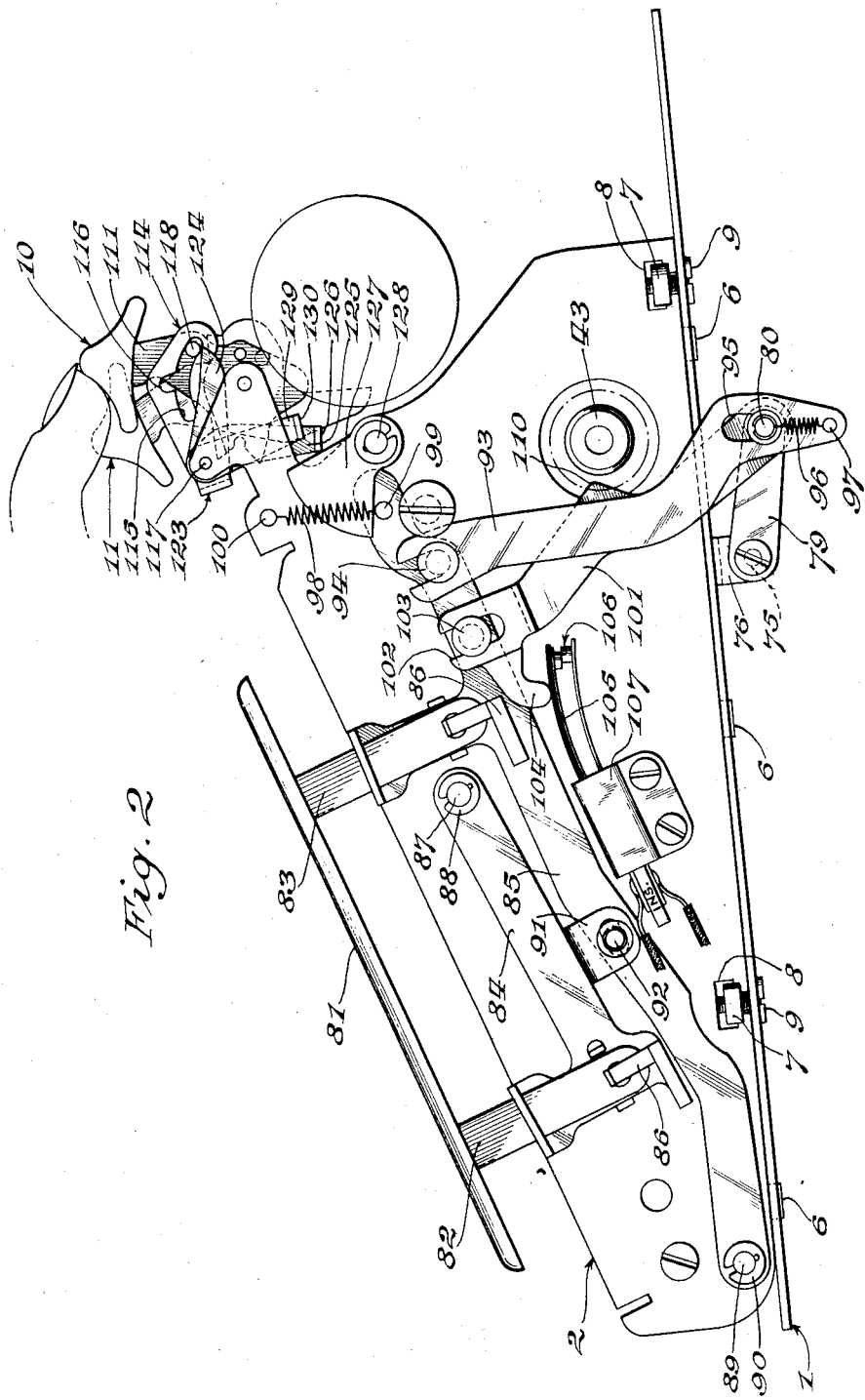

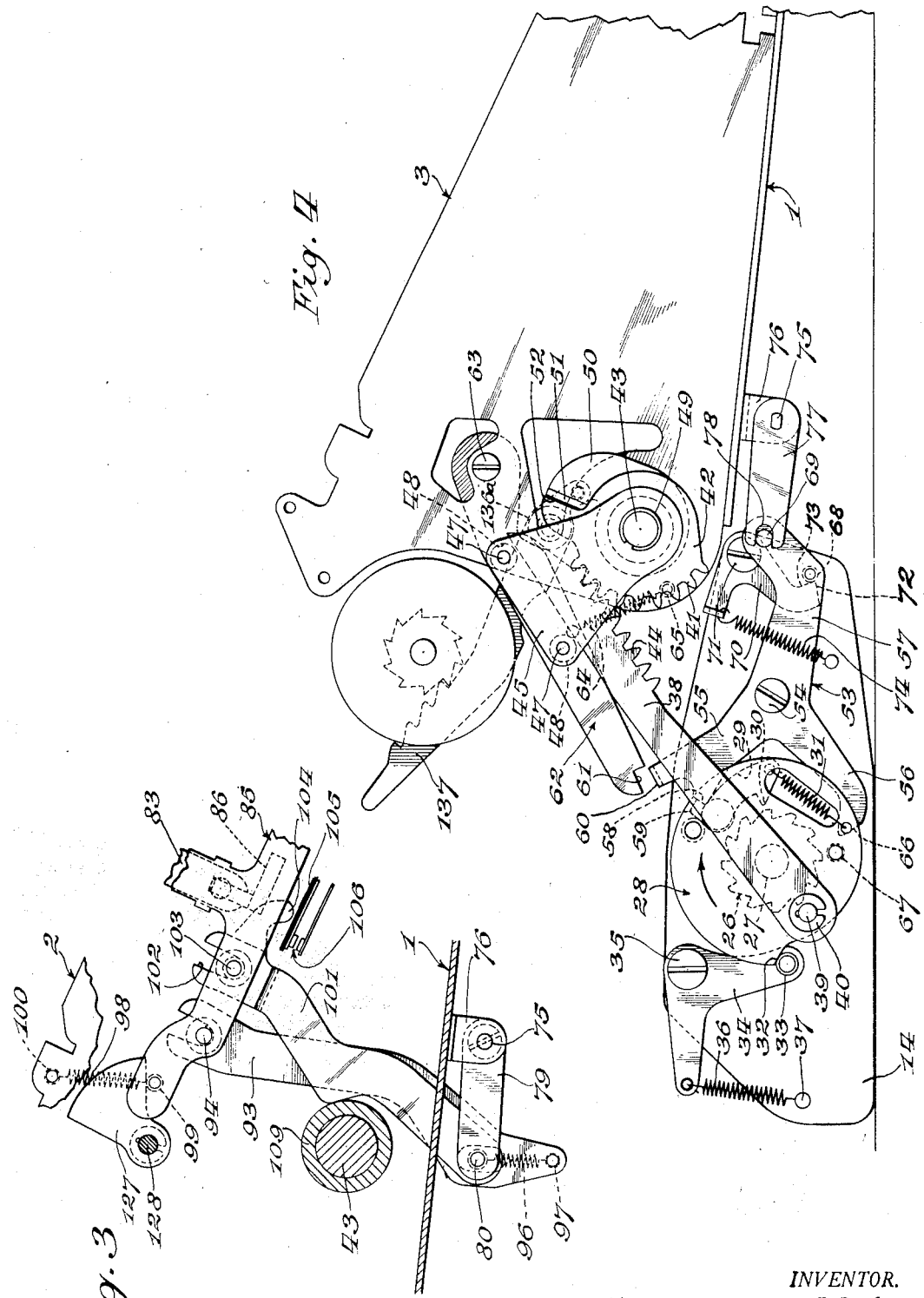

INVENTOR.
Thomas O. Mehan
BY
Williams, Bradbury & Hinkle
Attys.

Nov. 14, 1944.　　　T. O. MEHAN　　　2,362,709
CALCULATING MACHINE
Filed Nov. 21, 1941　　　5 Sheets-Sheet 5

INVENTOR.
Thomas O. Mehan
BY
Williams, Bradbury & Hinkle
ATT'YS.

Patented Nov. 14, 1944

2,362,709

UNITED STATES PATENT OFFICE 2,362,709

CALCULATING MACHINE

Thomas O. Mehan, Park Ridge, Ill., assignor to Victor Adding Machine Co., Chicago, Ill., a corporation of Illinois Application November 21, 1941, Serial No. 419,823

1 Claim. (Cl. 235—130)

My invention relates generally to calculating machines, and more particularly to improvements in the driving mechanism and interlocks therefor.

More specifically, it is an object of my invention to provide an improved portable calculating machine of the general type shown in my copending applications Serial No. 282,787, filed July 4, 1939, and Serial No. 371,366, filed December 23, 1940, which may be driven manually or be driven by an electric motor, and in which the conversion from one form of drive to the other may be readily made.

A further object of the invention is to provide improved interlocks between the manually operated controls and the driving mechanism of a calculating machine, whereby misoperation of the machine is prevented.

A further object is to provide a calculating machine capable of being optionally driven either by hand or by an electric motor in which the means rendering the electric motor drive effective are locked against operation when the machine is conditioned for manual operation.

A further object is to provide an improved drive mechanism for calculating machines in which improved means are provided to prevent operation of the motor drive mechanism until the operating cycle of the machine has been completed.

A further object is to provide an improved electric motor drive mechanism for calculating machines in which the machine has an oscillatory main shaft driven in one direction by the electric motor and returned by a spring.

A further object is to provide an improved portable calculating machine having provisions whereby it may optionally be driven by an electric motor or by hand, which is simple in construction, light in weight, and which may be economically manufactured.

Other objects will appear from the following description, reference being had to the accompanying drawings, in which:

Fig. 1 is a partial right side elevational view, partly in section, of a calculating or adding machine with the casing and other parts removed to more clearly show the motor switch and associated controlling mechanism, all parts being shown in normal position;

Fig. 2 is a view similar to Fig. 1, but showing the motor switch closed by actuation of one of the electrified control keys;

Fig. 3 is a fragmentary detail view showing the motor bar in depressed position, as in Fig. 2, but with the hub of the operating handle blocking the motor bar lock to prevent closing of the motor switch;

Fig. 4 is a partial left side elevational view of the machine shown in Fig. 1 illustrating the motor trip lock, motor drive mechanism, and associated locks and detents therefor;

Since the invention disclosed herein is concerned primarily with the drive and control of calculating and like machines, wherein the machines are driven electrically or manually, only so much of the machine as is necessary for the understanding of the present invention is shown.

While the use of a calculating machine is facilitated by the provision of an electric motor driving mechanism, there are frequently occasions when a machine must be manually driven if it is to be operated, as during intervals of failure of the power supply, during adjustment or repair of the machine, or in such instances when a current supply of proper voltage and frequency is not available. Portable calculating machines are frequently used by auditors, salesmen, engineers, and business men, members of the military forces, and others, who find it necessary or convenient to take a calculating machine with them while traveling and to use the machine in conveyances where a suitable supply of electric energy is unobtainable.

General description

The machine of my invention may be described generally as a portable calculating machine having an oscillatory main shaft which is adapted to be driven in one direction by an electric motor, or by a hand-operated crank, and is driven on its return stroke by an energy storing spring. The machine is equipped with a motor starting bar as well as other controls for initiating operation of the machine by the electric motor, and is provided with a removable crank for hand operation. Interlocks are provided so that the motor key bar and other controls for initiating operation by the electric motor are rendered inoperative upon attachment of the hand crank to the machine. Means are also provided to prevent the electric motor operated driving mechanism from starting a second cycle of operation prior to the completion of a first cycle of operation by the operating mechanism of the machine. The interlocks are so arranged that operation of the controls necessary for manual operation of the machine is not interferred with by the disablement of the control mechanism for electric motor operation.

Motor drive

The motor drive and control mechanism disclosed herein is adapted for use on any adding, calculating, or similar machine, but is of particular utility when used in conjunction with an adding machine designed to be driven optionally, either electrically or manually.

Figure 7:
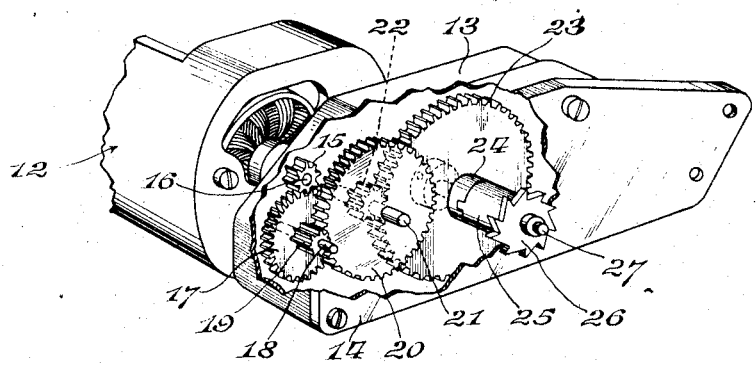
Figure 6:
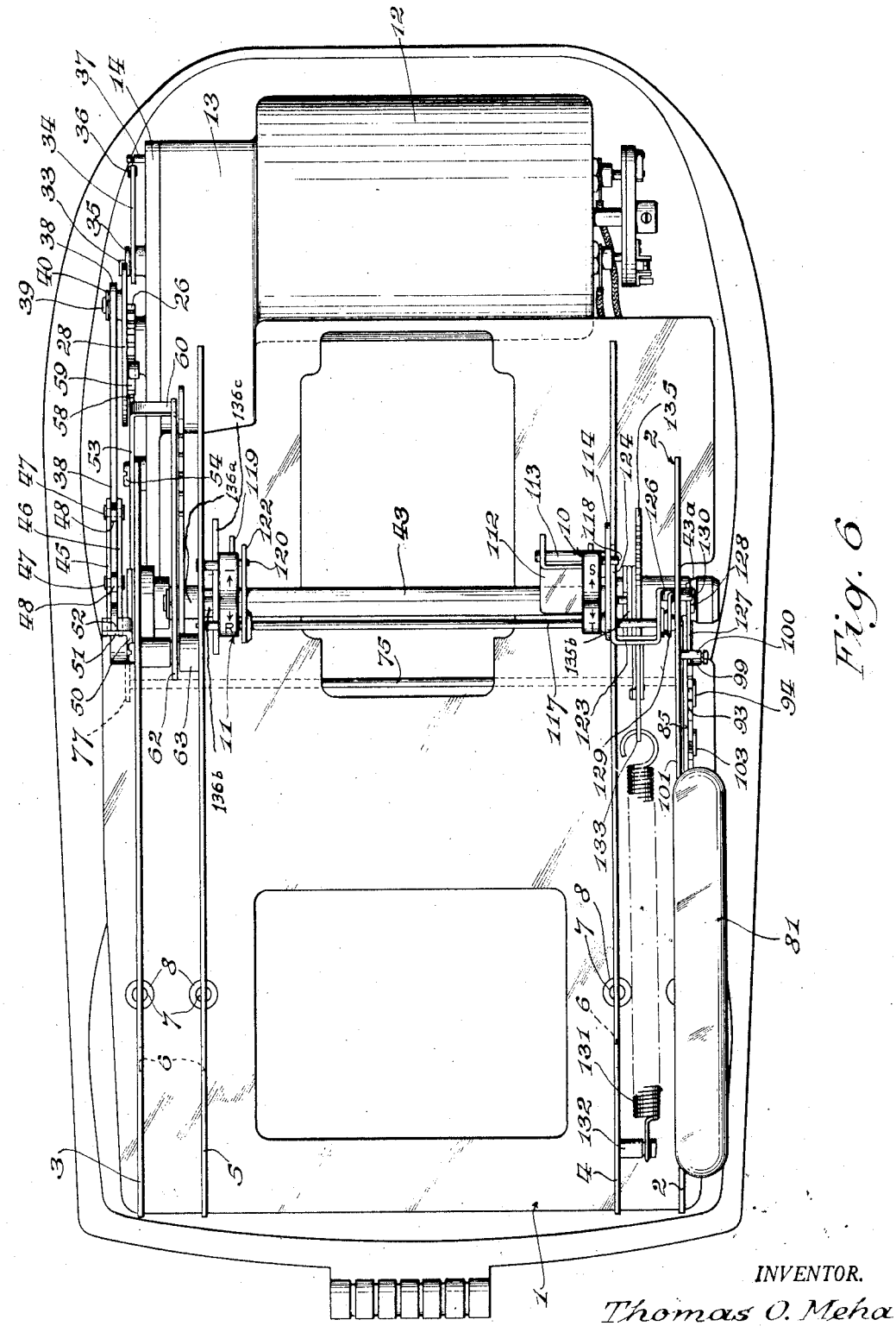
Fig. 6 is a fragmentary plan view illustrating the vertical frame plates, base, motor, gear box, and main shaft; and, Fig. 7 is a fragmentary perspective view of the motor, gear box, and driving gears, with the gear box and cover partially broken away to clearly show the gears of the motor drive.

As shown in Figs. 6 and 7, the motor drive mechanism is illustrated generally as comprising any suitable electric motor 12, preferably of the universal type, the housing of which includes a gear box 13 having its open side closed by a cover plate 14. A train of reduction gears housed within the gear box preferably comprises a pinion 15, non-rotatably secured to the motor shaft 16. This pinion meshes with a gear 17 non-rotatably secured to a shaft 18, which latter is suitably journaled in bearings in the gear box 13 and removable cover 14. Also non-rotatably secured to the shaft 18 is a pinion 19 which meshes with a gear 20 non-rotatably secured upon a shaft 21. Fixed to the shaft 21 for rotation with gear 20 is a third pinion 22 meshing with a gear 23, the hub 24 of which is splined to the hub 25 of a drive ratchet 26. Gear 23 and ratchet 26 are free to rotate as a unit upon shaft 27, while a drive plate 28 (Fig. 4) is fixed for rotation with this shaft.

Referring now more particularly to Fig. 4, a drive pawl 29 is pivotally carried on the inside of the drive plate 28, has a nose 30 engageable with the teeth of the ratchet 26, and is normally urged toward meshing engagement with said teeth by a tension spring 31, the ends of which are secured to the pawl and to the drive plate 28 respectively.

Frame

The frame (employed with the present invention) of the machine comprises the usual base plate 1, on which are mounted a pair of outer vertical frame plates 2 and 3 and a pair of inner vertical frame plates 4 and 5. These plates are preferably provided with a plurality of projections 6 (Figs. 1 and 2) which extend through corresponding slots in the base plate for locating purposes. The frames are preferably locked to the base plate by nuts 7, which are received by and prevented from turning within T-shaped slots 8 in the frame plates, and bolts 9 passing through the base plate, as is clearly shown in Fig. 2. The inside vertical frame plates 4 and 5 (Fig. 6) are employed not only in supporting the keyboard unit (not shown), but also in furnishing the pivotal support for the total and sub-total control key 10 and for the repeat and subtract control key 11, and in addition thereto, the support for various other parts and mechanisms, as is more fully shown in my aforesaid co-pending applications.

A cam projection 32 on the periphery of the drive plate 28 is adapted, at the completion of each revolution of said drive plate, to engage a roller 33 on one arm of a detent lever 34. The detent lever 34 is pivoted on a shouldered stud 35 secured to the cover plate 14 and is biased by a tension spring 36 to hold its roller 33 against the peripheral edge of the drive plate 28. The spring 36 has its ends secured to a rearwardly extending arm of the detent lever 34 and an anchoring stud 37 on said gear box cover plate 14, as is clearly shown in Fig. 4. The purpose of this detent is to prevent the spring 31 from rotating the drive plate 28 counter-clockwise at the end of each operating cycle. Such rotation, if permitted, would allow the nose 30 of pawl 29 to effect undesired reengagement with the teeth of ratchet 26.

One end of a drive rack 38 is pivoted to drive stud 39 carried by the drive plate 28 and retained thereon by a keeper 40. The rack 38 is in engagement with the teeth 41 of a drive segment 42, which is rotatably mounted on the main operating shaft 43 (hereinafter referred to as the main shaft) of the machine for oscillation therewith. The teeth 44 of said rack 38 are maintained in mesh with the teeth 41 of the segment by means of a guide consisting of a pair of plates 45, 46 (Figs. 4 and 6), which are secured together at their outer ends by shouldered studs 47 which form spindles for rollers 48 engaging the upper edge of the rack. The guide plates 45, 46 straddle the drive segment 42 and rack 38 and are pivotally mounted upon the main shaft 43 and suitably maintained thereon as by a keeper ring 49. A drive arm 50, non-rotatably secured to the main shaft 43, has a sidewardly projecting lug 51, adapted to be engaged and driven by a projection 52 of drive segment 42, when the latter is driven in a clockwise direction (as viewed in Fig. 4) by the rack 38. Thus, it will be seen that the drive segment 42 and drive arm 50 form a one-way driving connection, so that for each complete revolution of the drive plate 28 the main shaft will be positively driven only throughout its forward or clockwise (Fig. 4) stroke. The main shaft is to be driven through its counter-clockwise or return stroke by a main spring 131 (Figs. 1 and 6) in a manner to be described hereinafter.

As shown in Fig. 4, a motor trip lever 53 is pivotally mounted on a shouldered stud 54 screwed in the cover plate 14. The lever 53 has three arms 55, 56, and 57. Arm 55 of said trip lever terminates in a bifurcated or forked end, comprising a fork 58 serving as a stop for the heel 59 of drive pawl 29, and a fork bent inwardly to form an ear 60 for cooperation with the notched end 61 of a motor trip lock link 62.

The link 62 is pivotally mounted on a spacing stud 63 located between the left outer frame 3 and left inner frame 5, (Fig. 6) and its notched end is normally urged toward the ear 60 under the influence of a spring 64 (Fig. 4), the ends of which are respectively anchored to the link and to a spring stud 65 projecting inwardly from the left outer frame 3.

Arm 56 of trip lever 53 terminates in a cam projection 66 which is adapted to be engaged by a laterally disposed pin or roller 67 carried by the drive plate 28. Such engagement takes place near the end of each complete revolution of said drive plate, in a manner to rock the trip link 53 counter-clockwise sufficiently to bring the fork 58 into the path of heel 59 of drive pawl 29. Thus, the nose 30 of said pawl is withdrawn from the teeth of drive ratchet 26 to sever the driving connection between the motor 12 and said drive plate 28.

The third arm 57 of a motor trip lever 53 has an inwardly projecting stud or pin 68 and an outwardly projecting pin 69. A detent bell crank 70, pivoted upon a shouldered stud 71 secured to cover plate 14, has, on its free end, cam surfaces 72, 73, which cooperate with the pin or roller 68. This detent 70 is resiliently held against the pin or roller 68 by the spring 74, as clearly illustrated in Fig. 4, to maintain the motor trip arm 53 in either position to which it is rocked.

The mechanism for operating the motor trip lever 53 will now be described, referring to Figs. 1, 4, 5, and 6. This mechanism comprises a transversely arranged operating shaft 75 pivotally carried by downwardly projecting brackets 76 screwed to the underside of base plate 1 (Figs. 1 and 4). An operating arm 77 fixed to the left-hand end of this shaft has its outer end provided with an open end slot 78, which receives the pin 69 of motor trip arm 53. The right-hand end of shaft 75 (Figs. 1 and 5) has fixed thereto a second operating arm 79, the outer end of which carries a stud 80. It will be observed, from the description thus far given, that any counterclockwise movement given to the operating arm 77 (Fig. 4) will in turn, through the pin 69, cause the motor trip lever 53 to be rocked clockwise on its pivot 54, and hence lift the end of fork 58 clear of the heel 59 on drive pawl 29, thus permitting spring 31 to rock said pawl on its pivot until the nose 30 thereof engages one of the teeth of drive ratchet 26.

The right-hand operating arm 79 can be rocked (clockwise as viewed in Figs. 1 and 5) by depression of a motor bar 81, or by actuation of the control keys of the machine, such as the combined total and sub-total key 10 and combined repeat and subtract key 11 by mechanism now to be described.

Figure 5:
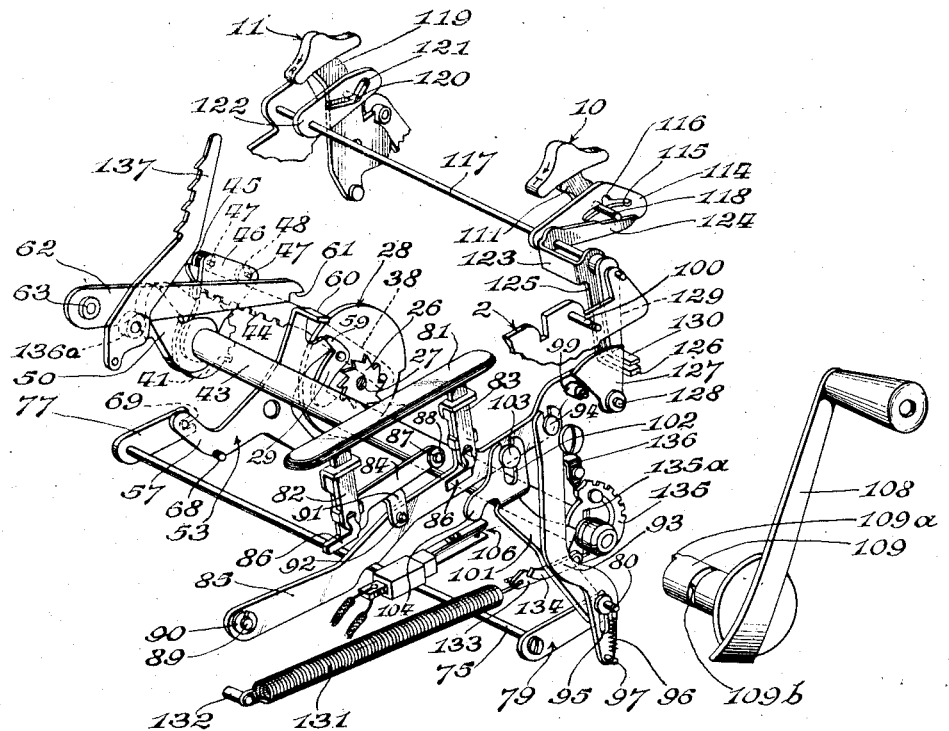
Fig. 5 is a fragmentary perspective view on a reduced scale illustrating the important operating parts and interlocks forming the subject matter of the present invention.

As shown in Figs. 1 and 5, the motor bar 81 has a pair of downwardly disposed stems 82, 83, which are detachably connected to the short motor lever 84 and long motor lever 85, respectively, as by spring clips 86. Short lever 84 has one end pivoted on a stud 87 projecting outwardly from the right outer frame plate, and is retained on said stud by a keeper 88, whereas, the long lever 85 has one end similarly pivoted on a stud 89 also projecting outwardly from right outer frame plate 2 and maintained thereon as by a keeper 90. The levers 84, 85 are pivotally connected to one another by a projection 91 of lever 84 and stud 92 of lever 85. Motor link 93 has its upper end slotted to embrace a shouldered stud 94, which is secured to lever 85, to form a lost motion connection between these parts.

In the lower end of said link 93 is an elongated slot 95 to receive stud 80 of operating arm 79. Link 93 is normally held in its elevated position by a tension spring 96, the ends of which are secured, respectively, to the stud 80 and to a stud 97 projecting laterally from the lower end of said link. Long motor lever 85 is normally held elevated by a spring 98 tensioned between a spring stud 99 on the lever and a spring stud 100 projecting from the outer frame plate 2. Lever 85 in turn holds the motor bar 81 and the short lever 84 in their normal elevated position, as illustrated in Fig. 1.

Motor trip lock

A motor bar lock link 101 has its upper end provided with an open end slot 102, which slidably receives a shouldered stud 103 of motor lever 85. The lower end of said lock link 101 is pivoted on the stud 80, and its upper end has a projecting finger portion 104, which overlies an insulating strip 105 attached to one of the contact arms of the motor switch 106. This switch is suitably secured to and supported by the right outer vertical frame plate 2 by a removable bracket 107, and is in the energizing circuit of the motor 12.

From the foregoing, it will be noted that each time the motor bar 81 is depressed (or, as will appear hereinafter, upon actuation of either control key 10 or 11), the long motor lever 85 will be rocked on its pivot 89 in a clockwise direction, and through its stud 94 will in turn move link 93 to its lowered position, to the positions in which these parts are shown in Fig. 2.

Assume for the moment, that operating handle or hand crank 108, which has a hub portion 109, has been removed from the main shaft 43 to condition the machine for electric operatin. Under these conditions, clockwise rocking of lever 85 will carry link 93 to its lowered position, and, through spring 96, will rock arm 79 clockwise. This movement of arm 79 pulls lock link 101 downwardly until its finger portion 104 engages and moves the insulating strip 105 to close the motor switch 106, as clearly illustrated in Fig. 2. It will be noticed therefore that closing of the motor switch 106 by a depression of the motor bar 81 (or by actuation of either control key 10 or 11) is dependent upon the absence of the hub portion 109 of the hand operating crank 108 from the path of downward movement of the nose 110 of the lock link 101.

Let us assume now that it is desired to condition the machine for hand operation. This is accomplished by merely attaching the hub 109 of hand operating crank 108 to the main shaft 43, said hub being shown in vertical section in Figs. 1 and 3. With the hand crank 108 thus attached, depression of motor bar 81, or actuation of either control key 10 or 11, will be ineffective to close the motor switch 106. This is brought about by the nose 110 of said lock link 101 engaging the hub 109 of said hand operating crank and thus having its incipient downward movement arrested. With the link 101 thus blocked, the downward movement of link 93 merely stretches the spring 96, and arm 79 remains in its normal elevated position. The finger 104 is thus prevented from closing switch 106.

Electrified control keys

As previously mentioned, the control keys 10 and 11 are arranged to close the switch 106 for motor 12 whenever the hand crank has been removed from the machine. The interlocking mechanism employed for locking the total and sub-total key 10 either in neutral, in total, or in sub-total position, and for locking the repeat and subtract key 11 either in neutral or in subtract position is substantially the same as that shown in my aforesaid application Serial No. 371,366. However, in the present application, this locking mechanism cooperates with newly added means to perform the additional function of controlling the motor switch 106, and for this reason will be briefly described herein.

The control key 10, shown in neutral position in Figs. 1, 5, and 6, may be swung forwardly to total position or rearwardly to sub-total position. The key 10 is attached to a stem 111 secured to a bail 112 pivoted at 113. An arm 114, having a curved slot 115 and a central notch 116, is provided for the purpose of locking the control key 10 against operation while the control key 11 is in repeat or subtracting position. Accordingly, this arm 114 is fixed on a transverse shaft 117, and is positively rotated clockwise (Figs. 1, 2, and 5) by the operation of the control key 11, thereby to bring the notch 116 into engagement with a pin 118 extending from the side of the key stem 111.

The control key 11 fixed on a key stem 119 serves as a repeat key when rocked forwardly, and when rocked rearwardly it sets up the mechanism for a subtraction operation, as disclosed in the aforesaid application Serial No. 371,366. It follows, therefore, that whenever the control key 11 is rocked rearwardly to its subtract position or forwardly to its repeat position, a pin 120 traveling in a slot 121 in arm 122, fixed on the shaft 117, will lock the control key 10 in neutral position. Further, whenever the control key 10 is rocked rearwardly to its sub-total position, or forwardly to its total position, the pin 120 traveling in the slot 121 in arm 122 will lock the control key 11 in neutral position.

It has been explained above how operation of the control key 10 will lock control key 11 in a neutral position, and, conversely, how operation of the control key 11 will lock control key 10 in a neutral position. It will now be explained how operation of said keys 10 and 11 accomplishes the closing of motor switch 106 when the machine is conditioned for electric operation by removal of the hand operating handle 108.

Referring to Fig. 5, a bail 123, free for pivotal movement upon the shaft 117, has a rearwardly projecting leg 124, the top edge of which underlies the pin 118, and a downwardly disposed leg 125, which has its free end bent sidewardly to form an ear 126. The construction is such that any rocking motion of key 10, either forwardly or rearwardly, will cause the pin 118 to engage leg 124 and rock said bail 123 clockwise, which in turn, through its ear 126, rocks an arm 127 counter-clockwise on its pivot stud 128 (Fig. 2) projecting from the outer right frame plate 2. This counter-clockwise motion of lever 127, through stud 99, rocks the long motor lever 85 clockwise on its pivot 89 and closes motor switch 106 through the link 93 and lock link 101 in a manner identical to that heretofore described relative to a depression of the motor bar 81. However, it will be noted that should the hand operating lever 108 be attached to the main shaft of the machine, lock link 101 will function as previously described to prevent closing of the motor switch 106 even though control key 10 is actuated.

An arm 129 (Fig. 5), non-rotatably secured to shaft 117 and projecting downwardly therefrom is located between leg 125 of bail 123 and outer frame plate 2 and has its free end bent sidewardly to form an ear 130 which overlies the ear 126 of said bail. It will now be apparent that any rocking motion of control key 11, either forwardly to its repeat position, or rearwardly to its subtract position, will cause the pin 120, operating in slot 121, to rock arm 122 clockwise (Figs. 1 and 5), and hence the shaft 117, arm 129 and ear 130 clockwise also, the ear in turn driving the lever 127 counter-clockwise on its pivot 89 against the pin 99. This rocks the lever 85 clockwise, which tends to close the motor switch 106 whenever the lock link 101 is not blocked by hub 109 of operating handle 108 in the manner above described.

It has been explained how the motor trip lock link 62 (Fig. 4) may block motor trip lever 53. The operation and purpose of this lock will now be considered in more detail.

When the hand crank or operating handle 108 is removed from main shaft 43, and an electric source of power is supplied to motor 12, thus conditioning the machine for electric operation, it will be understood that for each depression of the motor bar 81 (or actuation of either of the control keys 10 or 11), the main shaft 43 will be driven throughout its forward stroke by drive rack 38 and drive segment 42. As previously mentioned, the return stroke of said main shaft is accomplished by the main spring 131 (Fig. 6) one end of which is anchored to a stud 132 on the inner frame plate 4 and its other end attached to links 133, 134, carried by a full stroke sector 135, which latter is rotatable on the main shaft, as shown in Figs. 1 and 5.

The full stroke sector 135 is connected to the main shaft in a well known manner, as by a powerful torsion spring 135b (as shown in my prior application Serial No. 313,896, filed January 15, 1940) permitting lost motion between the sector and shaft upon the forward stroke if the handle is pulled too rapidly or if the operating mechanism of the machine does not operate properly. The full stroke sector is provided with notches 135a (Fig. 5) adapted to receive lugs 109a formed on the end of the hub 109. The hub 109 is slotted to receive a spring detent 109b which cooperates with a suitable groove 43a near the end of the main shaft 43, thereby to hold the handle 108 in place, but permitting its removal by overcoming the holding force of the detent 109b.

During the forward stroke of the main shaft 43, the main spring 131 is charged sufficiently to drive the machine through the return stroke of the main shaft. However, should the driving power of this main spring fail to return the main shaft at the same rate of speed with which the rack 38 returns the drive segment 42, depression of motor bar 81 (or actuation of control keys 10 or 11) prior to the return of the main shaft to its normal position, would start the drive segment 42 through a second cycle before the drive arm 50 has had a chance to fully restore. Such condition might result in a lock-up of the machine due to the fact that full stroke pawl 136 might not have cleared the full stroke sector 135, since this does not take place until the extreme end of the return stroke of the main shaft.

To obviate this possibility, the purpose of the lock link 62 is to prevent tripping of the trip arm 53 until such time as the drive arm 50 and main saft 43 have been fully restored. To accomplish this result, the lock link 62 is actuated by a roller 136a (Figs. 4 and 5) conveniently carried by a ribbon feed pawl 137. The roller 136a is rotatable on a stud 136 projecting sidewardly from an arm 136c, which is fixed to the main shaft 43 (see Fig. 6). The construction is such that when the main shaft is in normal position, the notched end 61 of link 62 is held clear of ear 60 of motor trip lever 53 by the roller 136, as clearly shown in Fig. 4, against the tension of the spring 64. Thus, it will be seen that when the trip lever 53 is tripped, as by the depression of the motor bar 81, (thus rocking it clockwise as viewed in Fig. 4) its ear 60 will be carried beneath the lock link 62 past the notch 61, and immediately thereafter as the main shaft starts to move throughout its forward stroke, roller 136 will leave the link 62 permitting the spring 64 to draw said link against ear 60. Accordingly, when the trip arm is restored by the pin 67, the notch 61 will drop behind the ear 60 under the influence of spring 64 to prevent subsequent tripping of the lever 53 until such time as the main shaft is fully restored and the roller 136 has lifted the link 62 clear of the ear 80.

Operation

Since the operation of the various elements has been set forth as a part of the description of the machine, it will be necessary merely to review the more general operating characteristics of the machine.

Assuming that the machine is to be manually operated, the hand crank 108 is inserted in the machine with its hub 109 fitting over the end of the main shaft 43 and with its lug 109a forming a driving connection with the full stroke sector 135. The crank will be held in this position by the engagement of its detent 109b in the annular groove 43a formed in the end of the main shaft. The machine may then be operated in a normal manner. It will be noted that if the machine happens to be in the course of an electric motor driven operating cycle when it is endeavored to attach the hand crank, the nose 110 of the lock link 101 will prevent effective attachment of the handle until the cycle has been completed.

If desired, when the machine is to be manually operated for an extended period of time, the motor bar 81 may be removed from the machine since it is held in place merely by the spring clips 86. During manual operation of the machine, it will be noted that the segment 42, rack 38, and the one-revolution clutch mechanism, will remain stationary by virtue of the lost motion connection between the gear segment 42 and the drive arm 50. Thus, the electric driving mechanism does not in any way interfere with the manual operation of the machine.

Upon removal of the hand crank 108, the machine is automatically conditioned for electric motor operation and may be operated in the usual manner of an electric machine, since the electric motor drive mechanism is energized either by depression of the motor bar 81 or by rocking either of the control keys 10 or 11 from its normal position. The interlocks between these keys are, however, effective to prevent energization of the drive mechanism if it is endeavored to rock both of these keys at the same time.

It will be noted that the electric motor drive is effective to rotate the main shaft in one direction only (the usual "forward stroke") and that the main shaft is rotated in the opposite direction (return stroke) by the main spring 131.

An important feature of the operation of the machine is that the motor trip lock link 62 is effective to prevent closing of the motor switch 106 and to prevent the operation of the motor trip lever as long as the main shaft is displaced from its normal position. Thus, if the machine operates sluggishly upon its return stroke, or if for any reason the machine fails to complete its operating cycle, damage to the machine mechanism is prevented since it is impossible to cause the main shaft to commence a second oscillatory cycle until after it has completed the previous cycle.

Economies in the manufacture and maintenance of stocks of the calculating machine are effected because the electric motor-operated machine is of the same construction as the manually operated machine, with the addition of the motor and the one-revolution clutch mechanism. Thus, a purchaser of an electric motor-operated machine will obtain a machine capable of hand operation at the slight additional cost to the manufacturer of the hand crank, and the purchaser of a hand-operated machine may at any time have a motor and clutch assembly added to convert his machine for electrical operation. This ready convertibility of a hand-operated machine into a motor-operated machine is conducive to economies in manufacturing as well as in keeping on hand adequate stocks of the machine.

While I have shown and described a particular embodiment of my invention, it will be apparent to those skilled in the art that numerous modifications and variations may be made in the form and construction thereof without departing from the more fundamental principles of the invention. I therefore desire, by the following claim, to include within the scope of my invention all such similar and modified forms of the apparatus disclosed by which substantially the results of the invention may be obtained by substantially the same or equivalent means.

I claim:

In a calculating machine having a main shaft to be oscillated, an electric motor operable to rock said shaft in one direction from its normal position, spring means to rock said shaft in the reverse direction, a one revolution clutch mechanism forming a driving connection between said motor and said shaft, said mechanism including a clutch controlling three-arm lever having a detent engageable with one arm thereof to hold said lever alternatively in clutch-releasing or clutch-engaging position, manually operated means including a lock link and a resilient lost motion connection for moving said three-arm lever to clutch-engaging position, means including an element displaced by movement of said main shaft and engageable with a second arm of said three-arm lever to prevent movement of the latter from clutch-disengaging to clutch-engaging position until said main shaft approaches normal position, clutch driven means cooperating with the third arm of said three-arm lever as the shaft approaches normal position for restoring said lever to clutch-disengaging position, an operating handle detachably secured to said main shaft, and means forming part of said operating handle to prevent effective movement of said lock link by said manually operated means when said operating handle is secured to said main shaft, whereby said manually operated means is rendered incapable of moving said three-arm lever to clutch-engaging position while said operating handle is secured to said main shaft.

THOMAS O. MEHAN.